US009690403B2

(12) United States Patent
Kreek et al.

(10) Patent No.: US 9,690,403 B2
(45) Date of Patent: Jun. 27, 2017

(54) SHARED DOCUMENT EDITING AND VOTING USING ACTIVE STYLUS BASED TOUCH-SENSITIVE DISPLAYS

(71) Applicant: Research In Motion Limited, Waterloo, Ontario (CA)

(72) Inventors: Conrad A. Kreek, Waterloo (CA); Gerhard Dietrich Klassen, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 534 days.

(21) Appl. No.: 13/838,342

(22) Filed: Mar. 15, 2013

(65) Prior Publication Data
US 2014/0267081 A1 Sep. 18, 2014

(51) Int. Cl.
G06F 3/041 (2006.01)
G06F 3/0354 (2013.01)
G06F 3/01 (2006.01)
G06Q 10/10 (2012.01)

(52) U.S. Cl.
CPC .............. G06F 3/041 (2013.01); G06F 3/011 (2013.01); G06F 3/03545 (2013.01); G06Q 10/101 (2013.01)

(58) Field of Classification Search
CPC ........ G06F 3/041; G06F 3/03545; G06F 3/01; G06F 17/24
See application file for complete search history.

(56) References Cited

U.S. PATENT DOCUMENTS

| 5,517,578 | A | 5/1996 | Altman et al. |
| 5,883,338 | A | 3/1999 | Trunck et al. |
| 7,129,934 | B2 | 10/2006 | Luman et al. |
| 7,508,354 | B1 | 3/2009 | Sanders et al. |
| 7,605,940 | B2 * | 10/2009 | Silverbrook ........ G06F 3/03545 348/294 |

(Continued)

FOREIGN PATENT DOCUMENTS

| EP | 1589722 | 10/2005 |
| EP | 2487571 | 8/2012 |

(Continued)

OTHER PUBLICATIONS

Team WhiteBoarding with Weiddla-Painless Collaboration for the Web, http://www.twiddla.com, Nov. 28, 2012.

(Continued)

Primary Examiner — Tony N Ngo
(74) Attorney, Agent, or Firm — Jon Gibbons; Fleit Gibbons Gutman Bongini & Bianco P.L.

(57) ABSTRACT

An electronic meeting is attended by participants with touch-sensitive display devices. An electronic meeting server allows a group of selected participants to edit a shared document during the meeting. Another group of participants may cast votes during the meeting using objects at least partially created during the meeting. Each participant has an active stylus for interfacing with a touch-sensitive display device during the meeting. The active stylus has a stylus identification signal associated with each participant. The stylus identification signal allows for selection and management of the editing and voting groups and allows multiple participants to share a touch-sensitive display device.

23 Claims, 4 Drawing Sheets

(56) References Cited

U.S. PATENT DOCUMENTS

| | | | |
|---|---|---|---|
| 7,623,882 B2 | 11/2009 | Plestid et al. | |
| 7,913,162 B2 | 3/2011 | Hansen et al. | |
| 2007/0288835 A1 | 12/2007 | Watanabe | |
| 2009/0251441 A1 | 10/2009 | Edgecomb et al. | |
| 2010/0079414 A1 | 4/2010 | Ferlitsch | |
| 2010/0295782 A1 | 11/2010 | Binder | |
| 2011/0258537 A1* | 10/2011 | Rives | G06F 3/04883 715/255 |
| 2012/0242603 A1 | 9/2012 | Engelhardt et al. | |
| 2012/0272143 A1* | 10/2012 | Gillick | G06Q 10/10 715/256 |
| 2012/0317479 A1 | 12/2012 | Safa | |
| 2013/0024418 A1* | 1/2013 | Sitrick | G06Q 10/101 707/608 |
| 2013/0262992 A1* | 10/2013 | He | G06Q 50/18 715/255 |
| 2014/0253465 A1* | 9/2014 | Hicks | G06F 3/03545 345/173 |

FOREIGN PATENT DOCUMENTS

| | | |
|---|---|---|
| WO | 0102939 | 1/2001 |
| WO | 2009079116 | 6/2009 |

OTHER PUBLICATIONS

DoodleToo—room Lobby—the real online drawing chat with your friends! http://www.doodletoo.com, Nov. 28, 2012.
EESR dated Oct. 7, 2013, for European Patent Application No. 13159495.4.

* cited by examiner

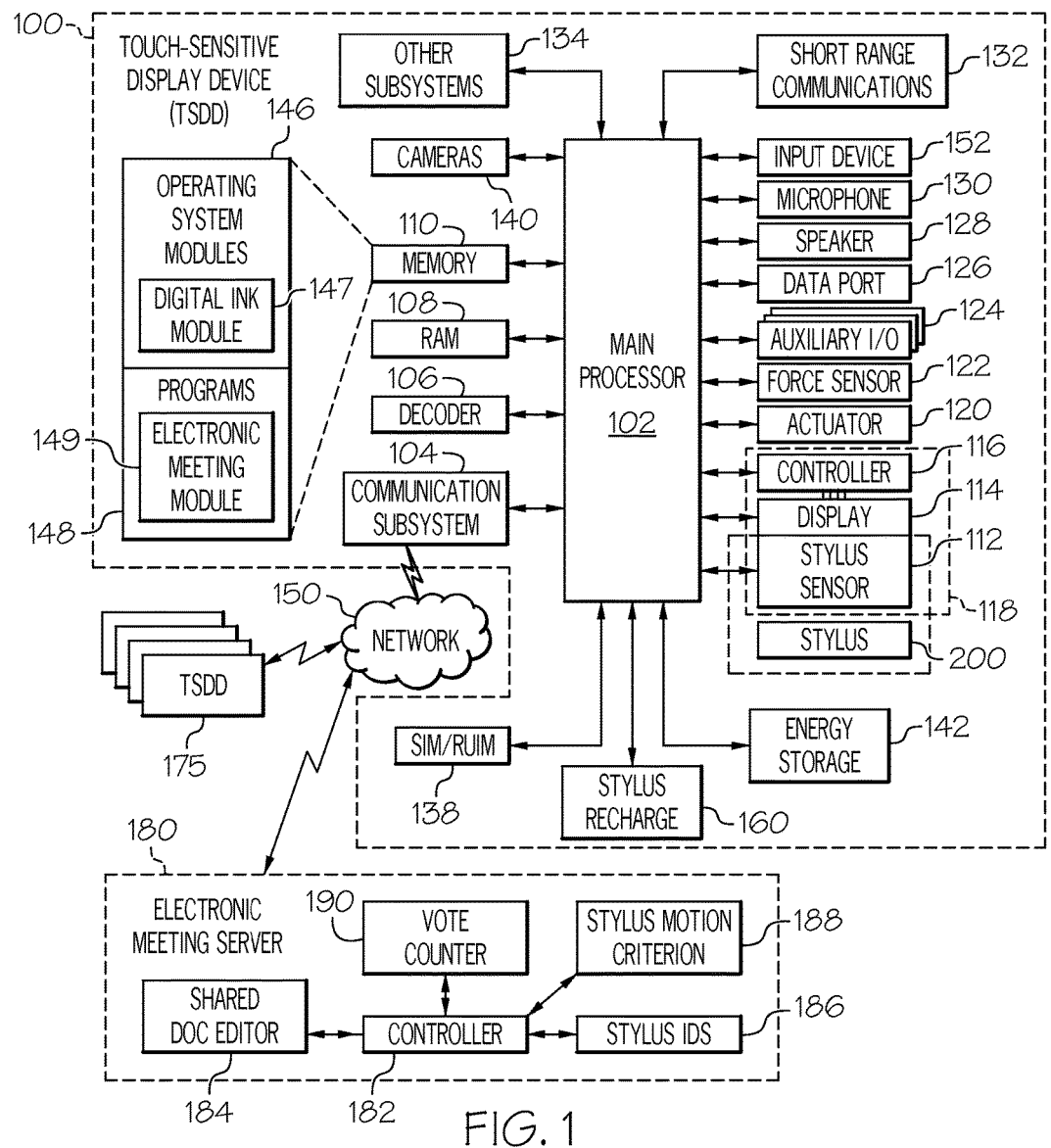
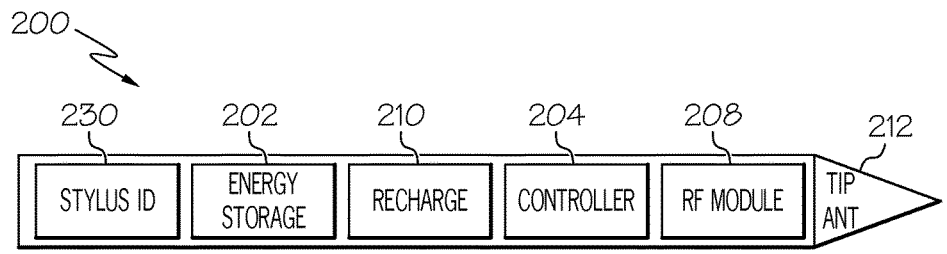
FIG. 1
FIG. 2

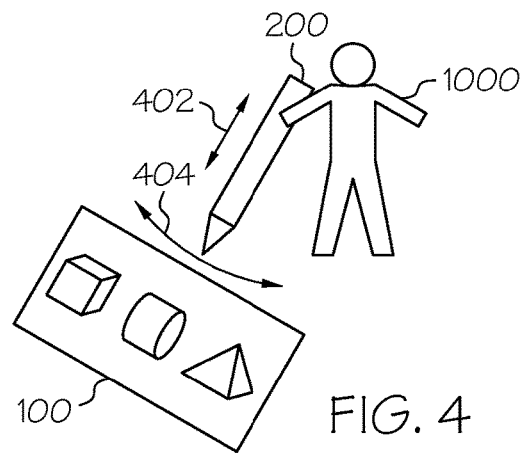
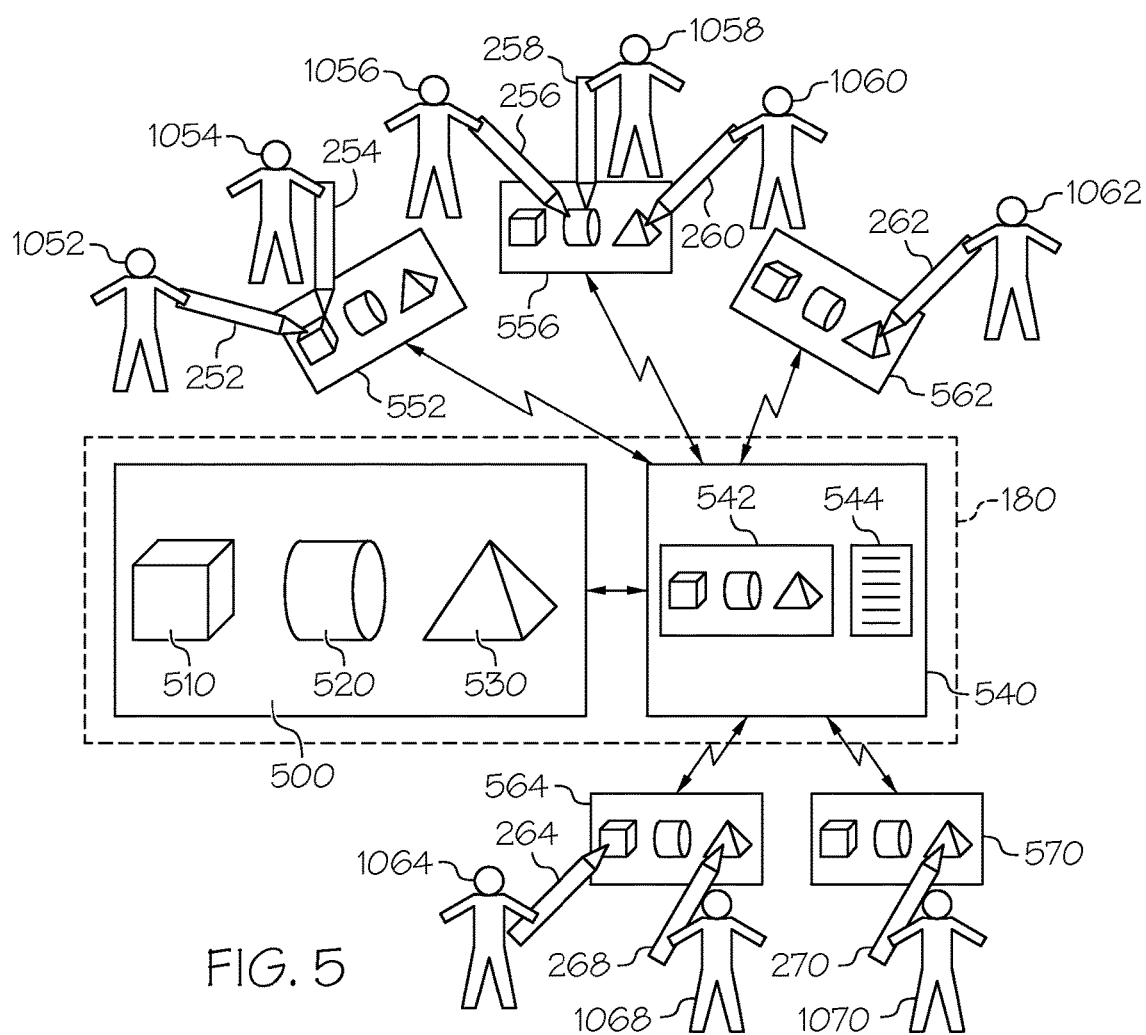

SHARED DOCUMENT EDITING AND VOTING USING ACTIVE STYLUS BASED TOUCH-SENSITIVE DISPLAYS

FIELD OF THE DISCLOSURE

The present disclosure generally relates to an electronic device with a touch-sensitive display and an active stylus used during an electronic meeting.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

A touch-sensitive display, also known as a touchscreen display, is particularly useful on handheld devices including PDAs, smart phones and tablets, for example, which are small and have limited space for user input and output. The information rendered on the touch-sensitive displays may be displayed and modified with an active stylus depending on the functions and operations being performed.

Electronic meetings allow an environment where multiple participants viewing multiple electronic device platforms collaborate on the editing of and voting for elements of shared documents even though the participants may be attending the meeting at various locales.

Improvements in electronic devices with touch-sensitive displays in this environment are desirable.

BRIEF DESCRIPTION OF THE DRAWINGS

The accompanying figures in which like reference numerals refer to identical or functionally similar elements throughout the separate views, and which together with the detailed description below are incorporated in and form part of the specification, serve to further illustrate various embodiments and to explain various principles and advantages in accordance with the present disclosure, in which:

FIG. 1 shows a representative block diagram of a system for providing shared document editing and voting using an active stylus based touch-sensitive display device.

FIG. 2 shows a representative block diagram of an active stylus.

FIG. 4 shows a representative example of a participant using an active stylus to make non-contact motions in close proximity to a touch-sensitive display device.

FIG. 5 shows a representative illustration of a shared document being edited and voted upon using active stylus based touch-sensitive display devices.

DETAILED DESCRIPTION

Figure 3:
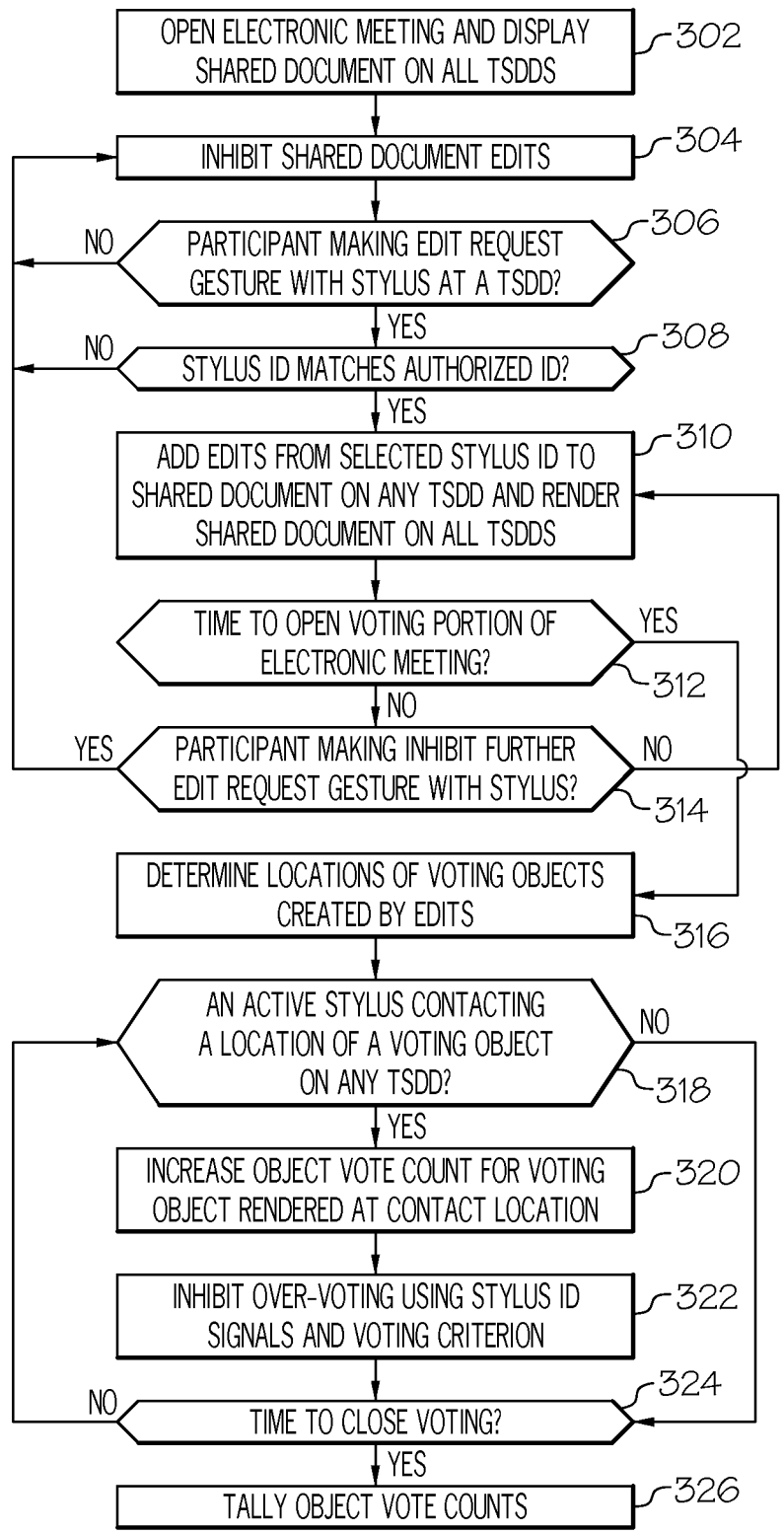
FIG. 3 shows a representative flow diagram of the system for providing shared document editing and voting using active stylus based touch-sensitive display devices.

While detailed embodiments are disclosed herein, it is to be understood that the disclosed embodiments are merely examples and that the devices, systems and methods described herein can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any appropriately detailed structure and function. Further, the terms and phrases used herein are not intended to be limiting, but rather, to provide an understandable description. Additionally, unless otherwise specifically expressed or clearly understood from the context of use, a term as used herein describes the singular or the plural of that term.

In one aspect, there is provided a method comprising: enabling a first edit of a shared document during an electronic meeting in response to a first criterion matching both a first identification signal indicative of a first active stylus and a first non-contact motion by the first active stylus in close proximity to a first touch-sensitive display device rendering the shared document, and adding the first edit to the shared document in response to both the enabling of the first edit and a first contact motion by the first active stylus contacting the first touch-sensitive display device.

In another aspect, there is provided a method comprising: rendering on a one touch-sensitive display device a shared document during an electronic meeting, the shared document including a first object at least partially created at a first object location during the electronic meeting, and a second object at least partially created at a second object location during the electronic meeting; and increasing a first object vote count in response to a detecting of a one active stylus contacting the first object location.

In another aspect, there is provided an apparatus comprising: a controller configured for enabling a first edit of a shared document during an electronic meeting in response to a first criterion matching both a first identification signal indicative of a first active stylus and a first non-contact motion by the first active stylus in close proximity to a first touch-sensitive display device rendering the shared document; and an editor configured for adding the first edit to the shared document in response to both the enabling of the first edit and a first contact motion by the first active stylus contacting the first touch-sensitive display device.

In another aspect, there is provided an apparatus comprising: a one touch-sensitive display device configured to render a shared document during an electronic meeting, the shared document including a first object located at a first object location, the first object at least partially created on the shared document during the electronic meeting, and a second object located at a second object location, the second object at least partially created on the shared document during the electronic meeting; and a vote counter configured for increasing a first object vote count in response to a detecting of a one active stylus contacting the first object location.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device having a touch-sensitive display and an active stylus, which is a portable electronic device in the embodiments described herein. Examples of the electronic device includes a Personal Information Manager (PIM), Personal Digital Assistant (PDA), a pager, a mobile phone, a cellular phone, a smart-phone, a super-phone, a tablet computer, and a laptop. The electronic device may also be a portable electronic device without wireless communication capabilities, such as a handheld electronic game device, digital photograph album, digital camera, or other device. Furthermore, the electronic device need not be portable and may be a stationary unit such as a Personal Computer (PC) or a workstation.

FIG. 1 shows a representative block diagram of a system for providing shared document editing and voting using an active stylus based touch-sensitive display device. The system includes a touch-sensitive display device 100 (TSDD) an electronic meeting server 180, and an active stylus 200. The touch-sensitive display device 100 includes multiple components, such as a processor 102 that controls the overall operation of the touch-sensitive display device 100. Communication functions, including data and voice communications, are performed through a communication subsystem 104. Data received by the touch-sensitive display device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. Energy storage module 142 includes one or more rechargeable batteries, super capacitors, or a port to an external power supply for powering the touch-sensitive display device 100.

The processor 102 interacts with other components, such as Random Access Memory (RAM) 108 and memory 110. The processor 102 also interacts a display 114, a stylus sensor 112 including a touch-sensitive overlay operably connected to a controller 116 that together comprise a touch-sensitive display 118. The processor 102 also interacts with an auxiliary input/output (I/O) subsystem 124, a data port 126, a speaker 128, a microphone 130, short-range communications 132, and other subsystem 134 which may include other device subsystems. Stylus sensor 112 and active stylus form a stylus sensor system 121 which is also able to interface with the touch-sensitive overlay of the stylus sensor 112. The processor 102 may optionally interact with one or more actuators 120 to provide tactile feedback and one or more force sensors 122 to detect a force imparted on the touch-sensitive display 118. Interaction with a graphical user interface is performed through the stylus sensor 112. The processor 102 interacts with the stylus sensor 112 via the controller 116. Information, such as objects including text, characters, symbols, images, icons, digital ink line segments defined by the active stylus, and other items that may be displayed or rendered on a portable electronic device, is rendered on the touch-sensitive display 118 via the processor 102. The processor 102 may interact with an orientation sensor 136 such as an accelerometer that may be utilized to detect a direction of gravitational forces or gravity-induced reaction forces. The processor 102 may interact with camera module 140 which may include one or more forward and/or rear facing cameras for photography, video conferencing or for optical recognition of gestures and objects such, as a stylus, for user interface operations. Stylus gestures may result from non-contact motion in close proximity to the touch-sensitive display device or a contact motion by the stylus upon the touch-sensitive display device.

To identify a subscriber for network access, the touch-sensitive display device 100 uses a Subscriber Identity Module or a Removable User Identity Module (SIM/RUIM) card 138 for communication with a network, such as the wireless network 150. Alternatively, user identification information may be programmed into memory 110.

The touch-sensitive display device 100 includes an operating system 146 including instructions for implementing at least portions of digital ink module 147, and software components or programs 148 that are executed by the processor 102 and are typically stored in a persistent, updatable store such as the memory 110. One such software component includes an electronic meeting module 149 for interfacing with an electronic meeting server during an electronic meeting. Memory 110 receives content from a computer readable medium comprising computer instructions executable on at least one processing unit. Additional applications or programs may be loaded onto the touch-sensitive display device 100 through the wireless network 150, the auxiliary I/O subsystem 124, the data port 126, the short-range communications 132, or any suitable other subsystem 134.

A received signal such as a text message, an e-mail message, shared document, or web page download is processed by the communication subsystem 104 and input to the processor 102. The processor 102 processes the received signal for output to the display 114 and/or to the auxiliary I/O subsystem 124. A subscriber may generate data items, for example e-mail messages, which may be transmitted over the wireless network 150 through the communication subsystem 104. For voice communications, the overall operation of the touch-sensitive display device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display may include a capacitive touch-sensitive overlay within stylus sensor 112. The stylus sensor 112 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

In one implementation, stylus sensor 112 employs touch-sensitive display 118 having a planar upper surface for supporting work sheets, e.g., rendered objects including drawings, charts, maps or the like. The touch-sensitive display 118 also has a generally planar grid of conductors underneath the work surface.

The conductor grid is composed typically of a plurality of straight, parallel, usually equi-spaced conductors extending in a horizontal or x-direction, and a plurality of straight, parallel, usually equi-spaced conductors extending in a vertical or y-direction. The stylus typically has an elongated, cylindrical body terminating in a conical tip. Near the tip, the stylus contains an antenna or an electrical coil disposed concentrically with the central axis of the stylus body.

Determination of stylus location and angle of tilt either contacting the display or in close proximity to the touch-sensitive display device is known to those familiar with the art. In one implementation, the active stylus wirelessly transmits electrical signals including a beacon signal that may be analyzed to determine a location, motion and orientation of the active stylus. The electrical signals are received by the grid conductors of the stylus sensor. Then, the grid conductors are scanned by detection circuitry to yield a series of voltage waveforms of various amplitudes corresponding to the location of the conductors with respect to the stylus. The voltage waveforms obtained from the conductors are analyzed to obtain a calculation of the position of the stylus tip on or in close proximity with the upper surface of touch-sensitive display 118. The stylus tilt of the active stylus may also be determined with further waveform analysis. The voltage waveform typically has a pair of spaced characteristic peaks whose magnitudes correspond to pen tilt. In one implementation, the stylus tilt of the stylus is determined by analyzing either the peaks or the magnitudes of the waveform at "points" (i.e., voltages corresponding to specific conductors, or, simply stated, conductor voltages) at fixed distances on either side of the apparent pen position, and inside the waveform peaks. The antenna or coil at the tip of the stylus may further have an asymmetrical wireless radiation pattern to help facilitate determination of the stylus tilt.

Furthermore, the active stylus may also sense the stylus contact pressure exerted by the user of the stylus when using the stylus to contact the touch-sensitive display and then transmit a stylus pressure signal included within its transmitted signals. The stylus may also have at least one button activated by a button press by the user and the status of the button may also be included within the transmitted signals.

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a stylus, finger, thumb, appendage, or other items, depending on the nature of the touch-sensitive display 118. Multiple simultaneous touches may be detected.

The touch-sensitive display 118 is also configured to detect contact and non-contact gestures. A contact gesture, such as a swipe, is a type of touch that begins at an origin point and continues to a finishing point while touch contact is maintained. A swipe may be long or short in distance, or duration, or both distance and duration. Two points of the swipe may be utilized to determine a vector that describes a direction of the swipe. The duration of the swipe may be determined from the origin point and finishing point of the swipe in time. A non-contact gesture is a motion of the active stylus in close proximity to the display and includes a side-to-side active stylus motion or a back-and-forth active stylus motion. The processor 102 receives data from the controller 116 to determine the direction, magnitude, and duration of the gesture. The gesture may be tracked and a plurality of sub-vectors determined for each gesture. The final sub-vector may be utilized to determine a distance and duration of a final portion of the gesture. The processor 102 receives data from the controller 116 to determine the speed of the gesture based on the distance and duration of the final portion of the active stylus motion.

Actuators 120 may be disposed beneath the touch-sensitive display 118 and may be depressed or activated by applying force to overcome the actuation force of the actuator 120. The actuators 120 may provide input to the processor 102 when actuated. Actuation of the actuator(s) 120 may result in provision of tactile feedback. Force sensors 122 may work in combination with the actuators to measure an applied force. Force generally refers to force measurements, estimates, and/or calculations, such as pressure, deformation, stress, strain, force density, force-area relationships, thrust, torque, and other effects that include force or related quantities.

Those familiar with the art will appreciate that there are numerous ways to determine stylus location, tilt and pressure either in contact with or in close proximity to the touch-sensitive display device that realize the function of stylus sensor system 121. For example, stylus location and tilt can be determined by optical triangulation with a pair of cameras included within camera module 140 monitoring one or more fiducials of the stylus, or sonic, ultrasonic audio or radio frequency triangulation using time-of-flight signaling and triangulation. These approaches can be performed with either an active or a passive stylus. Stylus pressure can be sensed in a number of ways including the use of force sensor 122. The stylus tilt of the stylus may also be determined by an accelerometer or gyro included within the stylus. Further, the tilt of the touch-sensitive display can be determined with an accelerometer or gyro associated with the touch-sensitive display. The stylus tilt of the stylus relative to the touch-sensitive display can be calculated by comparing the stylus and touch-sensitive display tilt angles.

Also included is a stylus recharge module 160 that manages recharging of the active stylus 200 when coupled to the touch-sensitive display device 100. In one implementation the stylus recharge module 160 transfers energy from energy storage module 142 to the active stylus 200.

Electronic meeting servicer 180 hosts electronic meetings between participants having touch-sensitive display device 100 and touch-sensitive display devices 175 that are coupled through wireless network 150. The electronic meeting server includes a controller 182 configured to control operation of its various components. Shared document editor 184 is configured to add edits to a shared document and facilitate viewing of the shared document by electronic meeting participants having touch-touch-sensitive display devices. To enable editing, the controller compares criterion including stylus identification signals 186 and stylus motion signals 188 with signals received from electronic touch-sensitive display devices 100 and 175. In order to facilitate voting by participants during an electronic meeting. Objects at least partially edited during the electronic meeting by shared document editor 184 are rendered at locations on each touch-sensitive display device. If an active stylus contacts one of the objects during a voting portion of the electronic meeting, then a vote count corresponding to the object is increased. Votes are then tallied in accordance with voting criterion. Those familiar with the art will appreciate that the functionality of the electronic meeting server may be included within a touch-sensitive display device participating in or hosting the electronic meeting.

FIG. 2 shows a representative block diagram of an active stylus. Active stylus 200 has an energy storage module 202, which may include a battery, super capacitor or other energy storage device, for powering the operation of the active stylus. Controller 204 monitors any input button (not shown) received on one or more buttons of the stylus operable by a user, and a pressure sensor (not shown) to activate the operation of the RF module 208. When a slight pressure on the tip 212 of the stylus is detected, the controller powers on the RF module which transmits RF signals trough an antenna at least partially included at tip 212. The RF signals includes a beacon signal that allows for determination of stylus proximity and movement for a non-contact gesture in close proximity to the touch-sensitive display, stylus contact location on the touch-sensitive display 118 as well as a stylus tilt of the stylus relative to the touch-sensitive display. Within the RF signals, the controller can include additional signals for processing by touch-sensitive display device 100 including a status signal indicative of the energy storage level of the energy storage module 202. The status signal could be a representation of the amount of energy left in the energy storage module (a signal ranging from 100% to 0% for example), or could indicate whether or not the amount of energy left in the energy storage module is low, (below 10% for example). In one example, below 10% would be a low energy level and 10% or above would not be a low energy level. When the energy level drops from 10% or above to below 10% indicates that the energy storage level of the active stylus has transitioned from a first level to a second level. The determination of this first transition may be made by controller 204 monitoring the energy storage module 202 or by the touch-sensitive display device 100 receiving a status signal from the active stylus 200 indicative of the energy level of the active stylus and determining the transition at processor 102 of the touch-sensitive display device.

Energy storage module 202 provides operating power for electrical components of the active stylus 200, including the controller 204 and RF module 208. Thus, energy is reduced from the energy storage module when the active stylus is in use, thereby reducing the energy storage level of the active stylus while defining the digital ink line segment. Recharge module 210 is an optional module that provides for the reception of energy from the stylus recharge module 160 and the increase of energy stored in the energy storage module 202. An optional energy harvest module (not shown) provides for the harvesting of motion energy imparted to the stylus and increasing the energy stored in the energy storage module. For example, a user may impart an external source of energy for the active stylus by providing a shaking action of the active stylus. Energy harvesting systems are known to those familiar with the art and include a weight coupled a piezoelectric element for converting motion energy imparted to the active stylus into electrical energy for recharging the energy storage module or a magnet moving in relation to an inductor for converting motion energy imparted to the active stylus into electrical energy for recharging the energy storage module.

In continuing with the above example, as additional energy is received and added to energy storage module 202, the energy level rises from below 10% to 10% or above indicating that the energy storage level of the active stylus has transitioned from the second level to back to the first level. The determination of this second transition may be made by controller 204 monitoring the energy storage module 202 or by the touch-sensitive display device 100 receiving a status signal from the active stylus 200 indicative of the energy level of the active stylus and determining the transition at touch-sensitive display processor 102.

Stylus identification 230 provides a unique identification signal indicative of the active stylus. In one implementation, each touch-sensitive display device 100 and 175 has an active stylus, each with a unique identification signal. If the identification signal is associated with a user of the active stylus, then the user could use any of a number of different touch-sensitive display devices while preserving the identity of the user during a participation in an electronic meeting, or multiple users could use a single touch-sensitive display device during an electronic meeting and have their shared document contributions made with their active stylus preserved. The controller 204 includes the stylus identification 230 signal within in the RF signals transmitted by RF module 208.

FIG. 3 shows a representative flow diagram of the system for providing shared document editing and voting using active stylus based touch-sensitive display devices. Step 302 opens an electronic meeting and renders the shared document on all touch-sensitive display devices participating in the electronic meeting. Step 304 initially inhibits edits to the shared document. Step 306 determines if an active stylus is making a non-contact motion in close proximity to a touch-sensitive display device that satisfies an active stylus motion signal 188 criterion for editing the shared document.

FIG. 4 shows a representative example of a participant using an active stylus to make non-contact motions in close proximity to a touch-sensitive display device. User 1000 holds active stylus 200 in close proximity to touch-sensitive display device 100. An up-and-down motion of the active stylus is shown at motion 402 and a side-to-side motion of the active stylus is shown at motion 404.

In one example, the motion of the active stylus at step 306 that satisfies the criterion is an up-and-down non-contact motion 402 relative to the touch-sensitive display. Those familiar with the art will appreciate that this determination of satisfaction of this criterion may be made within the touch-sensitive display device 100 and the determination communicated to the electronic meeting server 180, or the stylus motion information can be communicated from the touch-sensitive display device to the electronic meeting server and the determination made at the electronic meeting server, or the determination may be distributed between the touch-sensitive display device and the electronic meeting server. In one example implementation of the distributed approach, the touch-sensitive display device interprets the stylus motion to be one of a plurality of gestures and communicates a signal indicative of the gesture to the electronic meeting server. Then the electronic meeting server determines if the criterion matches the determined gesture signal.

Step 308 determines if the stylus identification signal matches the remaining criterion of a stylus identification signal 186 authorized to edit the shared document. If not, editing of the document remains inhibited at 304. The flow diagram executes step 310 if both the criterion matches an appropriate non-contact motion in close proximity to a touch-sensitive display device and the criterion matches the identification signal of the active stylus then the active stylus is selected. Step 310 adds edits from the selected stylus to the shared document. The shared document is then rendered on the touch-sensitive display devices.

If at step 312 it is not time to open the voting portion of the electronic meeting, then step 314 determines if an active stylus is making a non-contact motion in close proximity to a touch-sensitive display device that satisfies a criterion for inhibiting editing of the shared document. In one example, the motion of the active stylus at step 314 that satisfies the criterion is side-to-side non-contact motion 404 relative to the touch-sensitive display. Those familiar with the art will appreciate that the process for this determination of satisfaction of this criterion may be made within the touch-sensitive display device or within the electronic meeting server or otherwise distributed. Furthermore, in other examples a number of other motions may be used in place of motions 402 and 404. If editing is to continue, the flow diagram returns to step 310, otherwise the flow diagram returns to step 304. This representative flow diagram shows an implementation where only one active stylus at a time edits the shared document. Those familiar with the art will appreciate that other implementations can allow for a selection of more than one active styli to make concurrent edits to the shared document during an electronic meeting.

FIG. 5 shows a representative illustration of a shared document being edited and voted upon using active stylus based touch-sensitive display devices. Participants 1052-1070 are participating in the electronic meetings, each having a corresponding active stylus 252-270 in use with touch-sensitive display devices 552-570 which are coupled to electronic meeting server 180 via wireless network 150. Touch-sensitive display device 552 is used by participants 1052 and 1054. Touch-sensitive display device 556 is used by participants 1056, 1058, and 1060. Touch-sensitive display device 562 is used by participant 1062. Touch-sensitive display device 564 is used by participants 1064 and 1068. Touch-sensitive display device 570 is used by participant 1070. Shared document 500 is being edited within electronic meeting server 180 and shows three objects at least partially created during the electronic meeting. The three objects include cube 510, cylinder 520 and pyramid 530. Participants 1052-1062 are involved in editing the three objects 510-530 on the shared document 500 during the electronic meeting. Participants 1052 and 1054 are collaborating on editing cube 510 on touch-sensitive display device 552, participants 1056 and 1058 are collaborating on editing cylinder 520 on touch-sensitive display device 556, and participants 1060 and 1062 are collaborating on editing pyramid 530 on touch-sensitive display device 556 and 562 respectively. Participants 1064-1070 are observers of the edits of participants 1052-1062 and may participate in the voting phase of the electronic meeting. The use of active stylus identification signals allow participants to share touch-sensitive display devices during the electronic meeting while allowing criterion determinations for each participant to be maintained by the electronic meeting server.

A representation of processes by the electronic meeting server controller is shown within area 540. A version of the shared document is shown within area 542 where edit tracking is facilitated and a stylus identification list is shown within area 544.

Figure 6:
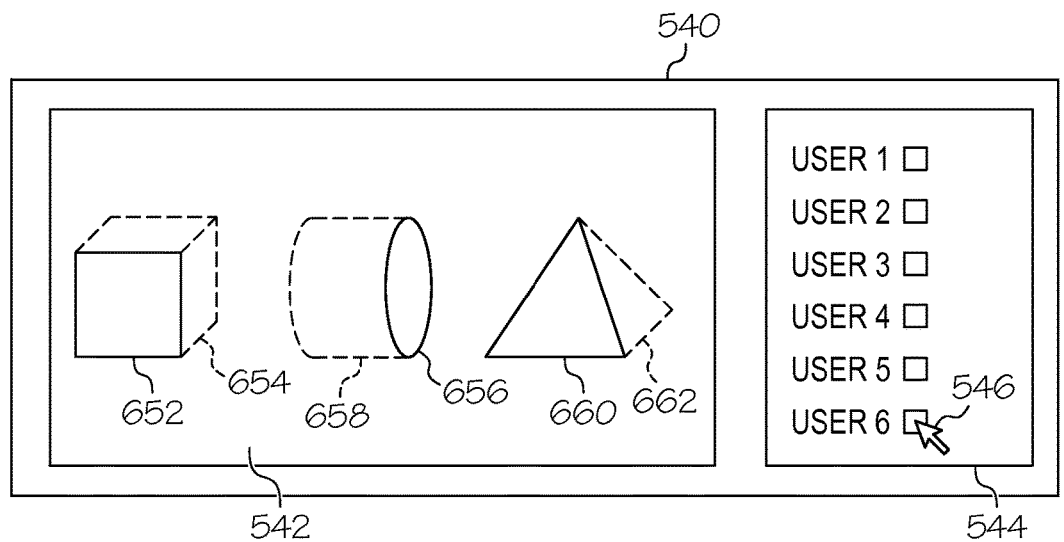
FIG. 6 shows a representation of the shared document with edit tracking and stylus identifications authorized to make edits to the shared document.

FIG. 6 shows a representation of the shared document with edit tracking and stylus identifications authorized to make edits to the shared document. In this example, edits of participant 1052 with stylus 252 on touch-sensitive display device 552 resulted in the foreground solid lined square 652 portion of cube 510. Edits of participant 1054 with stylus 254 on touch-sensitive display device 552 resulted in the dashed lined perspective portion 654 of cube 510. Edits of participant 1056 with stylus 256 on touch-sensitive display device 556 resulted in the solid lined foreground portion 656 of cylinder 520. Edits of participant 1058 with stylus 258 on touch-sensitive display device 556 resulted in the dashed lined perspective portion 658 of cylinder 520. Edits of participant 1060 with stylus 260 on touch-sensitive display device 556 resulted in the solid lined perspective portion 660 of pyramid 530. Edits of participant 1062 with stylus 262 on touch-sensitive display device 562 resulted in the dashed lined perspective portion 654 of pyramid 530. With the aforementioned information stored with the shared document, it is possible to determine which active stylus made which edits on which touch-sensitive display device at any time after the editing. It should be appreciated that in another implementation, a portion of the objects could be created before the electronic meeting and the objects further edited at the meeting. For example, foreground portions 652, 656 or 660 could have been created on the shared document before the electronic meeting and perspective portions 654, 658 or 662 edited during the meeting, thereby providing for one or more objects at least partially created during the electronic meeting.

Six lines identifying six users are shown within area 554 corresponding to six participants' stylus identifications of styli 252-262 associated with participants 1052-1062. In the single user editor implementation of the flow diagram of FIG. 3, a check at user six of line 546 indicates that user six is selected to edit the shared document.

Figure 7:
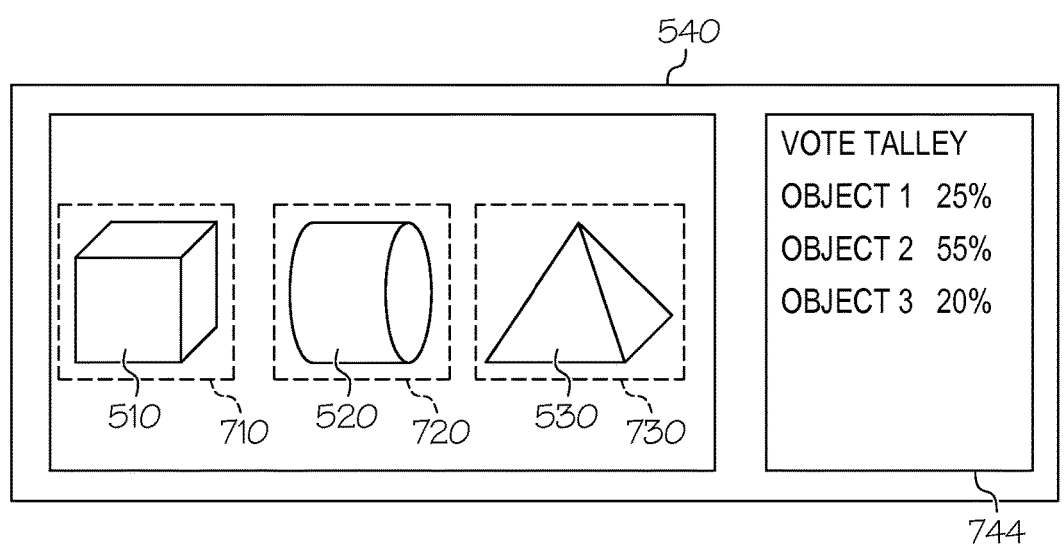
FIG. 7 shows a representative example of electronic meeting voting using active stylus based touch-sensitive display devices.

FIG. 7 shows a representative example of electronic meeting voting using active stylus based touch-sensitive display devices. A representation of processes by the electronic meeting server controller is shown within area 540. Cube 510 represents a first object that was at least partially created by edits during the electronic meeting. It is rendered at a first location as indicated by the area of dashed lined square 710. Cylinder 520 represents a second object that was at least partially created by edits during the electronic meeting. It is rendered at a second location as indicated by the area of dashed lined square 720. Pyramid 530 represents a third object that was at least partially created by edits during the electronic meeting. It is rendered at a third location as indicated by the area of dashed lined square 730. Participants 1064-1070 participate in voting based on objects 510-530 that were at least partially created by edits to shared document 500 by participants 1052-1062 during the electronic meeting by contacting locations 710-730 on touch-sensitive display devices 175 with their respective styli 264-270.

If at step 312 of FIG. 3 it is time to open the voting portion of the electronic meeting, then step 316 determines locations 710-730 of voting objects 510-530 that were at least partially created by edits during the electronic meeting. Step 318 determines if an active stylus is contacting a location of a voting object on a touch-sensitive display device. If not, and if voting is to remain open at step 324, then the flow diagram returns to step 318. Otherwise step 320 increases the object vote count for the voting object rendered at the contact location while step 322 inhibits over-voting using stylus identification signals and voting criterion. FIG. 1 shows participant 1064 is voting for object 510 by contacting location 710 on touch-sensitive display device 564 with stylus 264, and participant 1068 is voting for object 530 by contacting location 730 on touch-sensitive display device 564 with stylus 268, and participant 1070 is voting for object 530 by contacting location 730 on touch-sensitive display device 570 with stylus 270. Those familiar with the art will appreciate that any of a multitude of voting criterion may be contemplated at step 322. Example criterion include: one vote per stylus, two votes per stylus, two unique votes per stylus, a prohibition on voting if a stylus participated in object editing, or a prohibition on voting if a stylus participated in object editing the object being voted for by the stylus. If it is not time to close voting at step 324 then the flow diagram returns to step 318, otherwise votes are tallied at step 326. An example vote tally is shown within area 744 of FIG. 7.

The terms "a" or "an", as used herein, are defined as one as or more than one. The term "plurality", as used herein, is defined as two as or more than two. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, commanded, altered, modified, built, composed, constructed, designed, or that has any combination of these characteristics to carry out a given function. The term "adapted to" describes hardware, software or a combination of hardware and software that is capable of, able to accommodate, to make, or that is suitable to carry out a given function.

The terms "controller", "computer", "server", "client", "computer system", "computing system", "personal computing system", or "processing system" describe examples of a suitably configured processing system adapted to implement one or more embodiments of the present disclosure. Any suitably configured processing system is similarly able to be used by embodiments of the present disclosure, for example and not for limitation, a personal computer, a laptop computer, a tablet computer, a personal digital assistant, a workstation, or the like. A processing system may include one or more processing systems or processors. A processing system can be realized in a centralized fashion in one processing system or in a distributed fashion where different elements are spread across several interconnected processing systems.

The terms "computing system", "computer system", and "personal computing system", describe a processing system that includes a user interface and which is suitably configured and adapted to implement one or more embodiments of the present disclosure. The terms "network", "computer network", "computing network", and "communication network", describe examples of a collection of computers and devices interconnected by communications channels that facilitate communications among users and allows users to share resources.

The term "electronic device" is intended to broadly cover many different types of electronic devices used by persons, and that include a user interface that can interoperate with a user. For example, and not for any limitation, an electronic device can include any one or a combination of the following: a two-way radio, a cellular telephone, a mobile phone, a smartphone, a two-way pager, a wireless messaging device, a personal computer, a laptop personal computer, a tablet computer, a gaming unit, a personal digital assistant, and other similar electronic devices.

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method comprising:
   using a processor device, controlling a display and editing of a shared document on a plurality of touch-sensitive display devices participating in an electronic meeting via a wireless network, wherein the controlling comprises:
   displaying the shared document to be edited;
   displaying a list of active styli authorized to make edits to the shared document, wherein each active stylus is associated with one of the plurality of touch-sensitive display devices;
   initially inhibiting editing of the shared document;
   receiving a first non-contact motion gesture by a first active stylus in close proximity to a first touch-sensitive display device displaying the shared document;
   comparing the first non-contact motion gesture to stored non-contact stylus motion gestures comprising at least an edit request gesture and an edit inhibit gesture;
   determining that the first non-contact motion gesture matches a stored edit request gesture;
   responsive to determining that the first non-contact motion gesture matches the stored edit request gesture, determining whether a first identification signal of the first active stylus matches an authorized identification signal of one of the active styli authorized to make edits to the shared document;
   continuing to inhibit editing of the shared document responsive to determining that the first identification signal of the first active stylus does not match a first criterion authorizing editing of the shared document by the first active stylus;
   enabling a first edit of the shared document by the first active stylus during the electronic meeting in response to determining that the first identification signal of the first active stylus matches the first criterion authorizing editing of the shared document by the first active stylus;
   indicating on the list of active styli that the first active stylus is selected to edit the shared document; and
   adding the first edit to the shared document in response to both the enabling of the first edit and a first contact motion gesture by the first active stylus contacting the first touch-sensitive display device.

2. The method according to claim 1 further comprising:
   enabling a second edit of the shared document during the electronic meeting in response to a second criterion matching both a second identification signal indicative of a second active stylus and a second non-contact motion gesture by the second active stylus in close proximity to a second touch-sensitive display device rendering the shared document;
   indicating on the list of active styli that the second active stylus is now selected to edit the shared document; and
   adding the second edit to the shared document in response to both the enabling of the second edit and a second contact motion gesture by the second active stylus upon the second touch-sensitive display device.

3. The method according to claim 2 further comprising:
   enabling a third edit of the shared document during the electronic meeting in response to a third criterion matching both a third identification signal indicative of a third active stylus and a third non-contact motion gesture by the third active stylus in close proximity to the first touch-sensitive display device rendering the shared document;

indicating on the list of active styli that the third active stylus is now selected to edit the shared document; and adding the third edit to the shared document in response to both the enabling of the third editing and a third non-contact motion gesture by the third active stylus upon the first touch-sensitive display device.

4. The method according to claim 3 further comprising:

inhibiting a fourth edit of the shared document during the electronic meeting in response to a third criterion matching both a fourth identification signal indicative of a fourth active stylus not matching an authorized identification signal.

5. The method according to claim 4 further comprising:

receiving a fourth non-contact motion gesture different from the first non-contact motion gesture by the first active stylus in close proximity to the first touch-sensitive display device;

comparing the fourth non-contact motion gesture to stored non-contact stylus motion gestures comprising at least the edit request gesture and the edit inhibit gesture;

determining that the fourth non-contact motion gesture matches a stored edit inhibit gesture; and inhibiting further edits to the shared document responsive to determining that the fourth non-contact motion gesture matches the stored edit inhibit gesture.

6. The method according to claim 2 wherein the shared document includes a first object at least partially created at a first object location by the first edit, and a second object is at least partially created at a second object location by the second edit, the method further comprising:

rendering on a one touch-sensitive display device the shared document during the electronic meeting; and increasing a first object vote count in response to a detecting of a one active stylus contacting the first object location.

7. The method according to claim 6 wherein the detecting of the one active stylus includes detecting a one identification signal indicative of the one active stylus, the increasing the first object vote count further inhibits increasing the first object vote count in response to a determination that the one active stylus indicated by the one identification signal is associated with a first voting criterion inhibiting the increasing of the first object vote count.

8. The method according to claim 6 further comprising increasing a second object vote count in response to a detecting of another active stylus contacting the second object location.

9. The method according to claim 8 wherein the detecting of the other active stylus includes detecting another identification signal indicative of the other active stylus, the increasing the second object vote count further inhibits the increasing of the second object vote count in response to a determination that the other active stylus indicated by the other identification signal is associated with a second voting criterion inhibiting the increasing of the second object vote count.

10. The method according to claim 9 further comprising:

rendering on another touch-sensitive display device the shared document during the electronic meeting; and increasing a second object vote count in response to a detecting of another active stylus contacting the second object location on the other touch-sensitive display device.

11. A method comprising:

using a processor device, controlling a display and editing of a shared document on a plurality of touch-sensitive display devices participating in an electronic meeting via a wireless network, wherein the controlling comprises:

rendering on a one touch-sensitive display device a shared document during an electronic meeting, the shared document including a first object at least partially created at a first object location during the electronic meeting, and a second object at least partially created at a second object location during the electronic meeting;

displaying a list of active styli authorized to make edits to the shared document, wherein each active stylus is associated with one of the plurality of touch-sensitive display devices;

detecting a one active stylus by detecting a one identification signal indicative of the one active stylus;

opening a voting portion of the electronic meeting;

determining locations of the first and second objects at least partially edited during the electronic meeting; and increasing a first object vote count in response to the detecting of the one active stylus contacting the first object location during the voting portion of the electronic meeting.

12. The method according to claim 11 wherein the increasing the first object vote count further inhibits increasing the first object vote count in response to a determination that the one active stylus indicated by the one identification signal is associated with a first voting criterion inhibiting the increasing of the first object vote count.

13. The method according to claim 11 further comprising increasing a second object vote count in response to a detecting of another active stylus contacting the second object location.

14. The method according to claim 13 wherein the detecting of the other active stylus includes detecting another identification signal indicative of the other active stylus, the increasing the second object vote count further inhibits the increasing of the second object vote count in response to a determination that the other active stylus indicated by the other identification signal is associated with a second voting criterion inhibiting the increasing of the second object vote count.

15. The method according to claim 11 further comprising:

rendering on another touch-sensitive display device the shared document during the electronic meeting; and increasing a second object vote count in response to a detecting of another active stylus contacting the second object location on the other touch-sensitive display device.

16. The method according to claim 11 further comprising:

enabling a first edit of the shared document during the electronic meeting in response to a first criterion matching both a first identification signal indicative of a first active stylus and a first non-contact motion gesture by the first active stylus in close proximity to a first touch-sensitive display device rendering the shared document; and adding the first edit to the shared document in response to both the enabling of the first edit and a first contact motion gesture by the first active stylus contacting the first touch-sensitive display device, wherein the first edit at least partially creates the first object.

17. The method according to claim 11 wherein an at least one non-transitory computer readable medium comprises an at least one set of computer instructions executable on an at least one processing unit for implementing the method of claim 11.

18. An apparatus comprising:
a controller configured for controlling a display and editing of a shared document on a plurality of touch-sensitive display devices participating in an electronic meeting via a wireless network, wherein the controlling comprises:
displaying the shared document to be edited;
displaying a list of active styli authorized to make edits to the shared document, wherein each active stylus is associated with one of the plurality of touch-sensitive display devices;
initially inhibiting editing of the shared document;
receiving a first non-contact motion gesture by a first active stylus in close proximity to a first touch-sensitive display device displaying the shared document;
comparing the first non-contact motion gesture to stored non-contact stylus motion gestures comprising at least an edit request gesture and an edit inhibit gesture;
determining that the first non-contact motion gesture matches a stored edit request gesture;
responsive to determining that the first non-contact motion gesture matches the stored edit request gesture, determining whether a first identification signal of the first active stylus matches an authorized identification signal of one of the active styli authorized to make edits to the shared document;
continuing to inhibit editing of the shared document responsive to determining that the first identification signal of the first active stylus does not match a first criterion authorizing editing of the shared document by the first active stylus;
enabling a first edit of the shared document by the first active stylus during the electronic meeting in response to determining that the first identification signal of the first active stylus matches the first criterion authorizing editing of the shared document by the first active stylus;
indicating on the list of active styli that the first active stylus is selected to edit the shared document; and
an editor configured for adding the first edit to the shared document in response to both the enabling of the first edit and a first contact motion gesture by the first active stylus contacting the first touch-sensitive display device.

19. The apparatus according to claim 18 further comprising:
the controller further configured to:
enable a second edit of the shared document during the electronic meeting in response to a second criterion matching both a second identification signal indicative of a second active stylus and a second non-contact motion gesture by the second active stylus in close proximity to a second touch-sensitive display device rendering the shared document; and
indicate on the list of active styli that the second active stylus is now selected to edit the shared document; and
the editor further configured to add the second edit to the shared document in response to both the enabling of the second edit and a second contact motion gesture by the second active stylus upon the second touch-sensitive display device.

20. The apparatus according to claim 19 wherein the shared document includes
a first object at least partially created at a first object location by the first edit, and
a second object at least partially created at a second object location by the second edit, the apparatus further comprising:
a one touch-sensitive display device for rendering the shared document during the electronic meeting; and
a vote counter configured for increasing a first object vote count in response to a detecting of a one active stylus contacting the first object location during a voting portion of the electronic meeting.

21. An apparatus comprising:
a one touch-sensitive display device configured to render a shared document during an electronic meeting, the shared document including
a first object located at a first object location, the first object at least partially created on the shared document during the electronic meeting, and
a second object located at a second object location, the second object at least partially created on the shared document during the electronic meeting;
the one touch-sensitive display device displaying a list of active styli authorized to make edits to the shared document;
a controller for:
detecting a one active stylus by detecting a one identification signal indicative of the one active stylus;
opening a voting portion of the electronic meeting; and
determining locations of the first and second objects at least partially edited during the electronic meeting; and
a vote counter configured for increasing a first object vote count in response to detecting the one active stylus contacting the first object location during the voting portion of the electronic meeting.

22. The apparatus according to claim 21 wherein
the vote counter is further configured for increasing a second object vote count in response to a detecting of another active stylus contacting the second object location.

23. The apparatus according to claim 22 further comprising:
a controller configured for indicating on the list of active styli that a first active stylus is selected to edit the shared document;
the controller configured for enabling a first edit of the shared document during the electronic meeting in response to a first criterion matching both a first identification signal indicative of the first active stylus and a first non-contact motion gesture by the first active stylus in close proximity to a first touch-sensitive display device rendering the shared document; and
an editor configured for adding the first edit to the shared document in response to both the enabling of the first edit and a first contact motion gesture by the first active stylus contacting the first touch-sensitive display device, wherein the first edit at least partially creates the first object.

\* \* \* \* \*